(12) United States Patent
Gollogly

(10) Patent No.: US 11,671,240 B2
(45) Date of Patent: Jun. 6, 2023

(54) DATA ACCESS CONTROL WITH A CONFIDENTIAL BLOCKCHAIN NETWORK

(71) Applicant: MICROSOFT TECHNOLOGY LICENSING, LLC, Redmond, WA (US)

(72) Inventor: Jonathan J. Gollogly, Boonsboro, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 16/914,191

(22) Filed: Jun. 26, 2020

(65) Prior Publication Data

US 2021/0409192 A1 Dec. 30, 2021

(51) Int. Cl.
*H04L 9/06* (2006.01)
*G06F 16/23* (2019.01)
*G06F 21/31* (2013.01)
*H04L 67/1097* (2022.01)
*H04L 9/00* (2022.01)

(52) U.S. Cl.
CPC ........ *H04L 9/0637* (2013.01); *G06F 16/2379* (2019.01); *G06F 21/31* (2013.01); *H04L 67/1097* (2013.01); *H04L 9/50* (2022.05)

(58) Field of Classification Search
CPC ..... H04L 9/0637; H04L 67/1097; H04L 9/50; H04L 9/3239; H04L 63/105; H04L 63/107; H04L 63/0807; G06F 16/2379; G06F 21/31
See application file for complete search history.

(56) References Cited

U.S. PATENT DOCUMENTS

2017/0331810 A1\* 11/2017 Kurian .................. H04L 63/108
2018/0101842 A1\* 4/2018 Ventura ................. H04L 9/0841
(Continued)

OTHER PUBLICATIONS

Parducci, et al., "OASIS extensible Access Control Markup Language (XACML) TC", Retrieved From: https://web.archive.org/web/20200422055158/http://www.oasis-open.org/committees/tc_home.php?wg_abbrev=xacml, Apr. 22, 2020, 9 Pages.
(Continued)

*Primary Examiner* — Abu S Sholeman
(74) *Attorney, Agent, or Firm* — Newport IP, LLC; Jacob P. Rohwer

(57) ABSTRACT

Technologies are disclosed herein for secure data access. A client device accesses a slice of data using a ticket retrieved from a permissioned blockchain. To obtain the ticket, the client device submits ticket requests to multiple nodes of the permissioned blockchain. Each request identifies the slice of data, e.g. a particular row in a particular database table. Each request also includes parameters describing the circumstances of the request, such as the requesting user account, the geographic location of the computing device, etc. The permissioned blockchain stores each authorized combination of request parameters and data slices in a different access level block. If an access level block can be found that is associated with the requested slice of data and with all of the supplied parameters, and if that access level block grants permission, then the requested ticket is returned to the client device.

20 Claims, 11 Drawing Sheets

(56) References Cited

U.S. PATENT DOCUMENTS

| | | | |
|---|---|---|---|
| 2019/0149336 A1* | 5/2019 | Lancashire | H04L 9/3239 |
| | | | 713/176 |
| 2019/0149550 A1* | 5/2019 | Brakeville | H04L 63/08 |
| | | | 726/5 |
| 2019/0238327 A1* | 8/2019 | Li | H04L 9/0861 |
| 2019/0289013 A1 | 9/2019 | Makmel et al. | |
| 2019/0311147 A1* | 10/2019 | Gollogly | H04L 63/105 |
| 2019/0311447 A1* | 10/2019 | Strnad, II | G06F 16/27 |
| 2019/0349343 A1 | 11/2019 | Gollogly | |
| 2020/0089895 A1 | 3/2020 | Gollogly | |
| 2022/0058633 A1* | 2/2022 | Yantis | G06Q 20/3676 |
| 2022/0141034 A1* | 5/2022 | Bercovici | H04L 9/0637 |
| | | | 726/30 |
| 2022/0141231 A1* | 5/2022 | Simons | H04L 9/0618 |
| | | | 726/4 |

OTHER PUBLICATIONS

"International Search Report and Written Opinion Issued in PCT Application No. PCT/US21/027873", dated Jul. 21, 2021, 9 Pages.

* cited by examiner

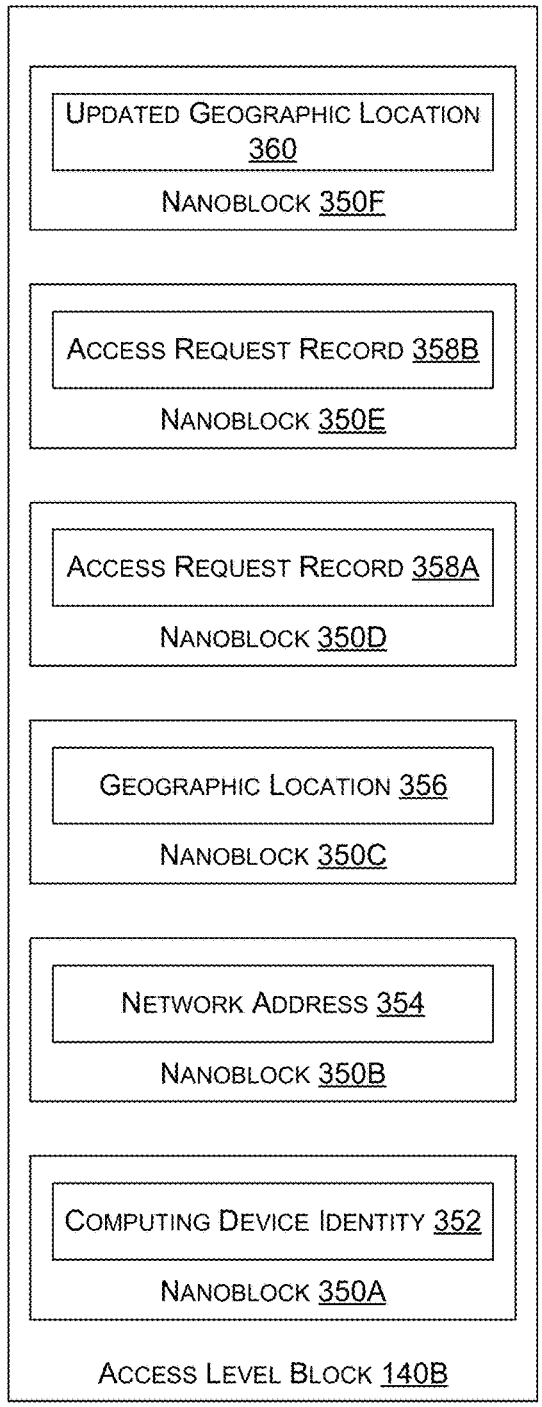
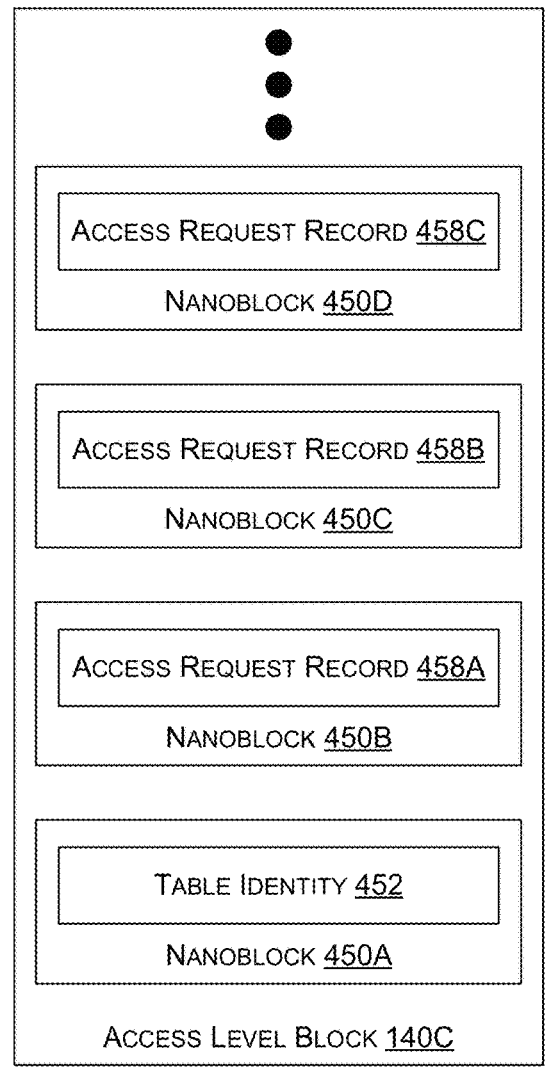
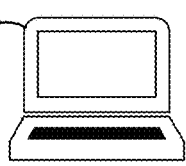
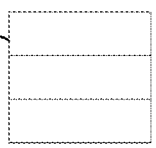
FIG. 3
FIG. 4

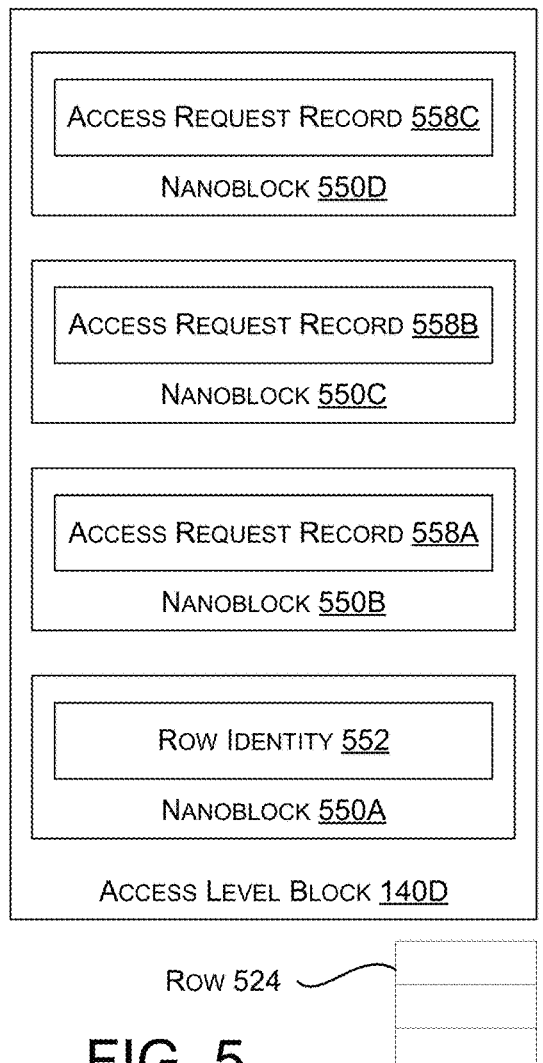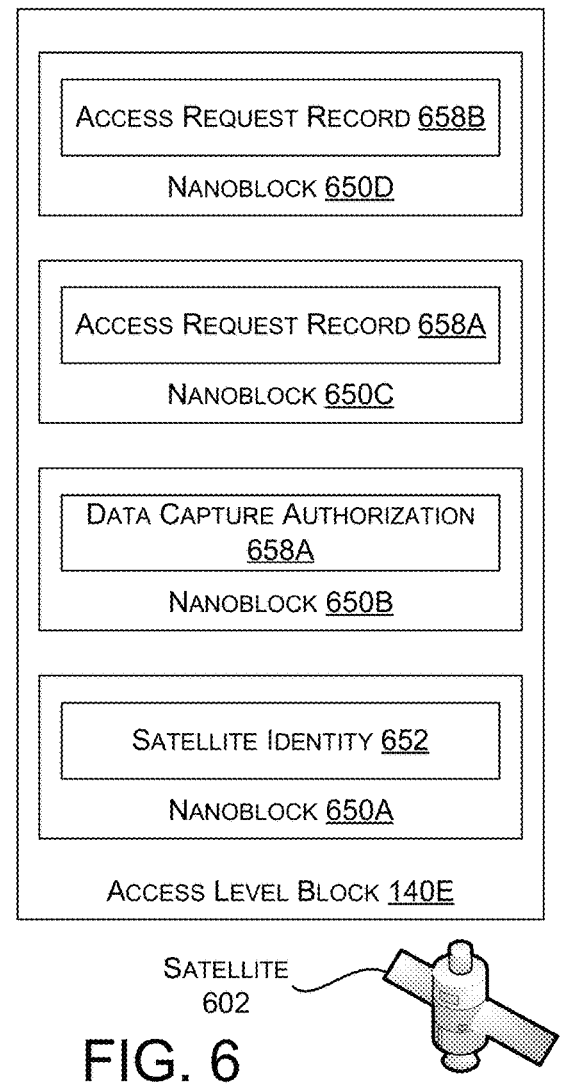
FIG. 5
FIG. 6

DATA ACCESS CONTROL WITH A CONFIDENTIAL BLOCKCHAIN NETWORK

BACKGROUND

Confidential information is material that an organization deems sensitive enough that it must be protected. Examples of confidential information include trade secrets, privileged communications between a professional and a client, corporate financial statements, and classified material obtained by a government body. Organizations often seek to protect this information with access control systems. Access control systems establish user accounts and groups, and assign permissions for particular users and groups to access particular documents.

Access control has traditionally been performed by centralized devices, e.g. domain controllers, federated authentication and authorization protocols, etc. One advantage of these centralized systems is ease of administration and simplified deployment. However, centralized access control systems have a number of drawbacks. Centralized access control systems suffer from a single point of failure. If a hacker compromises one computing device of the centralized system, the entire system becomes vulnerable to further intrusion, data theft, and privilege escalation. Another problem faced by centralized access control systems is that administrators have access to all of the information in the system, increasing the likelihood that a rogue or clumsy administrator may delete, disseminate, or otherwise mishandle sensitive data.

It is with respect to these and other technical challenges that the disclosure made herein is presented.

SUMMARY

Technologies are disclosed herein for secure data access. A client device accesses a slice of data using a ticket retrieved from a permissioned blockchain. To obtain the ticket, the client device submits ticket requests to multiple nodes of the permissioned blockchain. Each request identifies the slice of data, e.g. a particular row in a particular database table. Each request also includes a list of entities describing the circumstances of the request, such as the requesting user account, the identity of the computing device making the request, the geographic location of the computing device, etc. In response to the request, each node attempts to identify an access level block that is associated with the requested slice of data and the supplied list of entities. If such an access level block is identified, and if it grants permission to access the slice of data, then the requested ticket is returned to the client device. In some embodiments, a consensus between multiple nodes of the permissioned blockchain determines whether to return the ticket to the client device.

The disclosed embodiments address the shortcomings of centralized access control systems by providing redundancy, thereby improving the resiliency of the access control system. For example, if one or even a few nodes of the permissioned blockchain file are unavailable, the remaining nodes will allow secure data access to continue. Another improvement over centralized access control systems is resiliency in the face of hacking, as the consensus procedure will overrule a node that has been compromised by a hacker.

In some embodiments, access level blocks associated with specific entities and a particular slice of data are referred to as composite access level blocks. Examples of entities include user accounts, computing devices, locations, time of day, etc. Composite access level blocks may be used to store access permissions, including tickets usable to access the requested slice of data. In some embodiments, the permissioned blockchain stores each authorized combination of request parameters and data slices in a different composite access level block. This differs from prior art techniques of storing permissions in a small number of database tables or similar monolithic structures.

Access level blocks may also be used to represent individual entities, without reference to a slice of data. These access level blocks may be referred to as entity access level blocks because they refer to an entity itself, such as a user account or a building. In some embodiments, entity access level blocks are also queried in response to a ticket request to determine if the entity parameters of the request exist in the system individually.

In addition to composite access level blocks and entity access level blocks, access level blocks may also be used to represent slices of data. For example, an access level block may store a representation of a row of a particular database table that has a primary key of '52', or all elements of an eXtensible Markup Language (XML) document containing a specific attribute.

In some embodiments, access level blocks are write-only ledgers that are replicated across nodes in the permissioned blockchain. Each access level block stores data in a collection of write-only nanoblocks. For example, a composite access level block that grants access to a particular slice of data to a particular user account when accessed from a particular geographic location may store the user account, the geographic location, and an identifier of the slice of data in one or more nanoblocks. The composite access level block may also store an indication whether access is granted, and if so, the type of access granted.

Access level blocks may also log records of ticket requests in a nanoblock. For example, any time a composite access level block is queried in response to a ticket request, a record of the ticket request is logged in a nanoblock that is appended to the composite access level block. Furthermore, the ticket request may be logged to every entity access level block associated with the composite access level block. For example, a ticket request to access a particular slice of data from a particular user account and geographic location would be logged in the entity access level blocks for the slice of data, the user account, and the geographic location. By adding records of requests to access level blocks, and by ensuring that the access level blocks are write-only, a complete and accurate audit of ticket requests may be performed.

By encoding permissions in composite access level blocks, as opposed to encoding permissions in entity access level blocks, access can be granted without modifying entity access level blocks. For example, access to a project may be granted by a high-level executive without the knowledge of administrators that are responsible for adding user accounts. This solves the technological problem described above in which administrators with access to a centralized system have access to more knowledge than is necessary to perform their jobs.

In some embodiments, a ticket is sought for a user account to access a slice of data. A user account may be identified by a username, email address, or other identifier. A slice of data may refer to a range, portion, or other subset of data, such as a particular database row. A plurality of ticket requests may be sent to a plurality of nodes of the permissioned blockchain. Each request may include an identifier of the user account, user credentials, and an identifier of the slice of data, e.g. a primary key of a database table.

Each of the plurality of nodes may store an access level block that is associated with the user account and the slice of data, and that is not associated with other user accounts or other slices of data. In these embodiments, each combination of entities and data slices is represented by a distinct access level block.

Each access level block may contain a plurality of nanoblocks, including a nanoblock storing a ticket usable to access the slice of data and a nanoblock storing data usable to confirm the user credentials. Each of the plurality of ticket requests may cause a node of the permissioned blockchain to select the access level block associated with the user account and the slice of data. The selected access level blocks may be queried to determine whether the user credentials are valid.

In some configurations, an application running on the client device determines if a consensus for allowing the user account to access the slice of data exists. This determination may be made based on the determinations made by each of the plurality of nodes whether or not the user credentials are valid. If a consensus is reached that the user account has permission to access the slice of data, the client device retrieves the slice of data using the ticket received from at least one of the plurality of nodes.

In some configurations, each access level block associated with the user account and the slice of data comprises a copy of a write-only ledger distributed across the plurality of nodes.

In some configurations, a nanoblock storing a record of the request is appended to each access level block associated with the user account and the slice of data.

In some configurations, each of the plurality of nanoblocks are stored as a database, a data file, or a data table.

In some configurations, the user account is represented as an access level block replicated across a plurality of nodes of the permissioned blockchain.

In some configurations, a nanoblock storing a record of the request is added to the access level block representing the user account.

In some configurations, the slice of data is represented as an access level block replicated across a plurality of nodes of the permissioned blockchain.

In some configurations, a nanoblock storing a record of the request is added to the access level block representing the slice of data.

In some configurations, a request for a second user account to access the slice of data is processed using a second access level block that is associated with the second user account and the slice of data.

In some configurations, a request for the user account to access a second slice of data is processed using a third access level block that is associated with the user account and the second slice of data.

In some configurations, a client device sends a plurality of ticket requests to a plurality of nodes of a permissioned blockchain, each request including user credentials, an identifier of the user account, and an identifier of the slice of data. Each of the plurality of nodes stores an access level block that is associated with the user account and the slice of data and that is not associated with other user accounts or other slices of data. Each access level block comprises a plurality of nanoblocks including a nanoblock storing a ticket usable to access the slice of data and a nanoblock storing data usable to confirm validity the user credentials. Each of the plurality of ticket requests causes a node of the permissioned blockchain to select the access level block associated with the user account and the slice of data based on the identifier of the user account and the identifier of the slice of data. Each of the plurality of ticket requests also causes the node to query the selected access level block to determine whether the user credentials are valid. Each of the plurality of ticket requests also causes the node to receive a determination from the permissioned blockchain whether a consensus for allowing the user account to access the slice of data exists, the determination based on the determinations made by each of the plurality of nodes whether the user credentials are valid. The client device may then retrieve the slice of data using permissions received from at least one of the plurality of nodes.

In some configurations, every combination of user account, computing device requesting permission, location of the computing device requesting permission, and slice of data for which permissions have been granted is represented by separate access level blocks.

In some configurations, the permissions can be added to, modified, or deleted by adding another nanoblock to the access level block.

In some configurations, the slice of data comprises a table of a database, one or more rows of a table of data, a range of contiguous rows of a table of data, or one or more cells of a table of data.

In some configurations, the ticket allows the slice of data to be read, written to, forwarded, or annotated.

In some configurations, the client device is a data capture device, such as a camera, microphone, or satellite. The ticket may indicate a geographical location from which data capture by the device is authorized. The ticket may also indicate a time span during which the data capture device is authorized to capture data.

In some configurations, the ticket further indicates where the captured data is authorized to be stored.

In some configurations, a computing device causes a permissioned blockchain to be deployed to a plurality of nodes. This establishes a plurality of access level blocks. Each access level block is configured to store a plurality of nanoblocks, and each nanoblock is an encrypted data store. The plurality of access level blocks includes an access level block for each unique combination of user account and data slice for which access to a data slice has been granted to a user account. The corresponding access level block for each unique combination of user account and data slice may include security credentials for the user account.

For each access level block of the plurality of access level blocks, the computing device selects nodes among the plurality of nodes for deployment of the access level block and replicates the access level block to each of the selected nodes. In this way, after replicating the access level blocks, there are at least two copies of each access level block on the permissioned blockchain.

In some configurations, the permissioned blockchain is capable of performing cryptographic operations, including determining if a user account has been granted access to a slice of data based at least in part on the security credentials for the user accounts.

In some configurations, the permissioned blockchain is further capable of storing records of the cryptographic operations as nanoblocks of the access level blocks.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 is a block diagram illustrating an access level block associated with a computing device;

FIG. 4 is a block diagram illustrating an access level block associated with a table of data;

FIG. 5 is a block diagram illustrating an access level block associated with a specific row of a table of data;

FIG. 6 is a block diagram illustrating an access level block associated with a satellite that generates data;

DETAILED DESCRIPTION

Figure 1A:
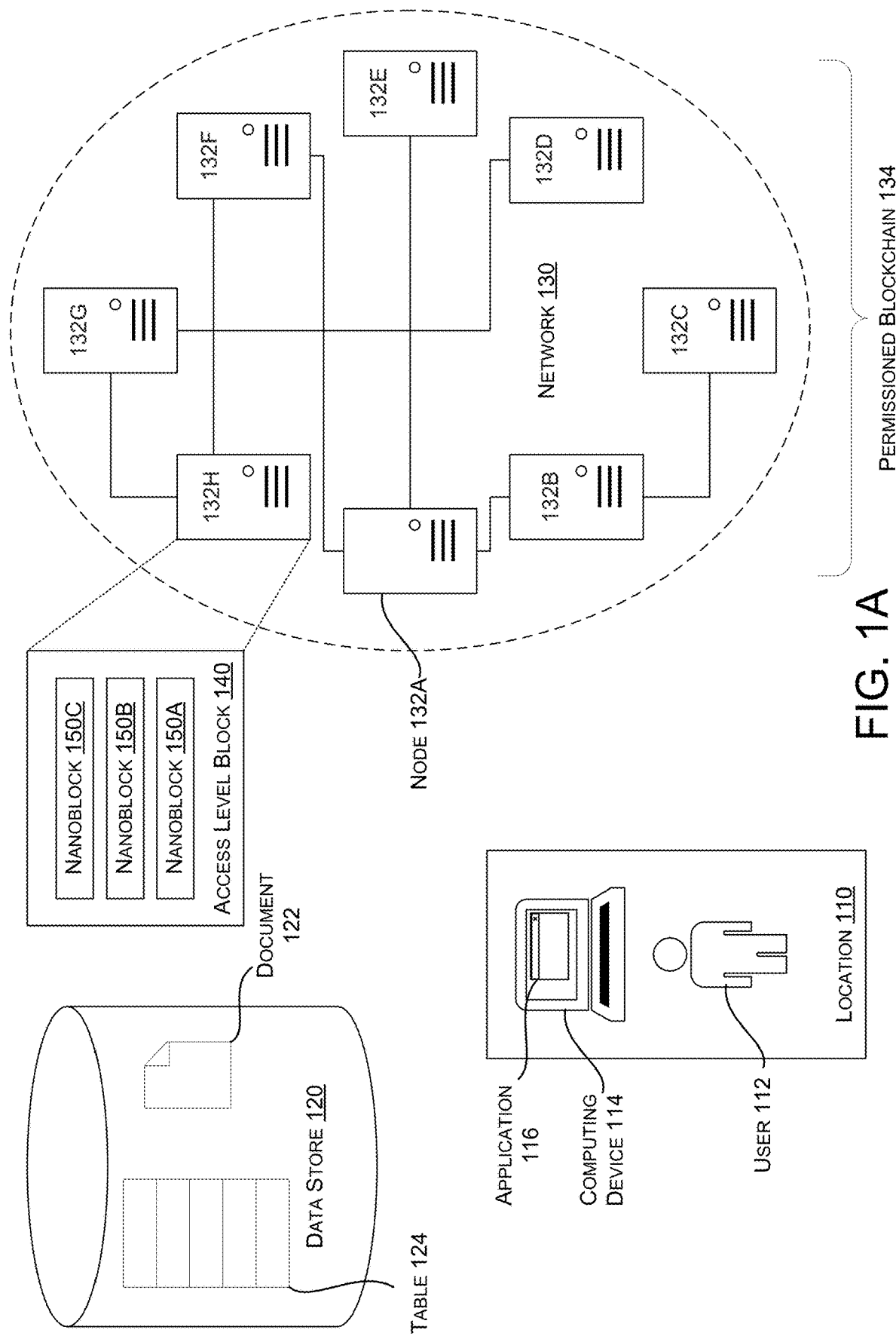
FIGS. 1A-1D are block diagrams illustrating an overview of a system for using a permissioned blockchain to access data in a data store.

The following detailed description is directed to technologies for using a permissioned blockchain to gain access to slices of data. As discussed briefly above, implementations of the disclosed technologies can enable access to data based on various entity parameters, such as the user account making the request, the slice of data being requested, the computing device making the request, etc. A slice of data refers to any subset of a collection of data, such as a subtree of tree data structure, or a specific row of a database table.

One technological benefit of the disclosed embodiments is providing fine-grained permissioned access to databases, data tables, structured, and unstructured data via access level blocks. Access level bocks are write-only blockchain ledgers that are replicated across multiple nodes of a permissioned blockchain. By providing a distributed access control technology, single points of failure are removed, increasing robustness. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, server-based systems, microprocessor-based or programmable consumer electronics, computing or processing systems embedded in devices (such as wearables, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for data access control with a confidential blockchain network are described.

FIG. 1A is a block diagram illustrating an overview of a system for using a permissioned blockchain to access data in a data store. In some configurations, user 112 operates computing device 114 at location 110. User 112 may be a person, a legal entity, a group of people, or the like. Computing device 114 may be any type of computer, tablet, smart phone, smart watch, or other type of computing device. Location 110 may be defined in terms of a geographic location, such as a geopolitical entity such as a city, state, or country, a Global Positioning System (GPS) coordinate, or a latitude and longitude or other coordinate system. Location 110 may also be defined in terms of proximity to a cell tower, Wi-Fi access point, or other radio antenna with a known location.

Data store 120 represents a data repository of any type. Data store 120 may run on-premises, locally, or be hosted on a server. Data store 120 may be a standalone application or represent a hosted service, such as a cloud-hosted data storage service. Data store 120 may contain table-based data, such as table 124, or data store 120 may contain documents, files, blobs, or any other type of unstructured data, such as document 122. Table based data may be relational data, e.g. data that follows a predefined schema and which is queried using Structured Query Language (SQL) queries. Table-based data may also be stored in a so-called "NoSQL" data store that stores documents, tables of key-value pairs, graphs, or the like.

Permissioned blockchain 134 comprises two or more nodes 132. Permissioned blockchain 134 is 'permissioned' in that an administrator selects the nodes 132 that form the blockchain, as opposed to blockchains that allow any computing device to participate. Nodes 132 may be implemented with any networked computing device, such as a server computing device, desktop computing device, supercomputer, or the like. Nodes 132 are connected by network 130, allowing access level blocks 140 to be replicated from one node to another, and to allowing results of querying access level blocks 140 on different nodes to be compared. Nodes 132 may be co-located geographically, in the same building or room, and/or nodes 132 may be distributed geographically. By distributing nodes 132 geographically across different time zones, countries, and continents, latency may be reduced when accessing a closest node 132 of the permissioned blockchain 134.

In some configurations, access level block 140 is a write-only copy of a ledger. Access level block 140 is one of a plurality of access level blocks that when distributed across nodes 132, comprise the permissioned blockchain 134. In some configurations, an entity access level block 140 is assigned to each man made, computer made (e.g. interpreted from raw data) or algorithmic (e.g. mathematically derived) driven slice of metadata or nanodata stored in data store 120. Each of these entity access level blocks 140 may be stored and replicated across nodes 132.

In some examples, access level blocks 140 represent users, e.g. user 112. When an access level block represents a user 112, it may include security credentials for the user. In some examples, for each access level block 140 of the plurality of access level blocks: nodes 132 are selected among the plurality of nodes for deployment of the access level block 140, and the access level block 140 is replicated to each of the selected nodes 132. In this way, after replicating the access level blocks 140 to nodes 132, there are at least two copies of each access level block 140 on the permissioned blockchain 134. When at least two copies of each access level block 140 are part of the permissioned blockchain 134, permissioned blockchain 134 is capable of performing cryptographic operations, including determining whether login credentials of user 112 are valid. For example, before a user 112 views a classified document 122, the permissioned blockchain 134 may be used to determine whether the user 112 has the proper security credentials to view the classified document 122. Permissioned blockchain 134 may further be capable of storing a log of details of the cryptographic operations. Login credentials and log entries may be stored in nanoblocks 150 of the access level blocks 140. Access level blocks 140 may also store, in a nanoblock 150, and indication that permissions have been revoked.

Access level blocks 140 may be defined for more entities than just users. Access level blocks 140 may be created for each defined security level, each defined user group, each defined physical location, each defined trigraph security marking, each defined project codeword, and each defined labeling or access control requirement. Access level blocks 140 may also be created for each database, each database row, each database cell, each database table, each database tree or subtree, each section of "structured" data, each area of "semi-structured data", each database partition, each piece of metadata, data or metadata received from sensors, and each defined labeling or access control requirement.

In some embodiments, A front-end user interface (UI) such as application 116, installed on the client device 114, may enforce security restrictions. For example, before a user 112 views a classified document 122, the front-end UI may communicate with the permissioned blockchain 132 to determine whether the user has the proper security credentials to view the classified document.

In some examples, each access level block 140 is configured to store nanoblocks 150, where each nanoblock 150 is an encrypted database, file, or other data store. In some examples, after being updated with additional nanoblocks 150 at a particular node 132, the access level blocks 140 may be replicated out to other nodes 132. In some examples, at least N copies are kept of each access level block 140, where N is at least two. By replicating changes to other nodes 132 in the permissioned blockchain 134, robustness is improved, as is resiliency against hackers gaining control of some of the nodes 132.

In a typical blockchain, every node has the same ledger. In some examples of permissioned blockchain 134, for security reasons, a certain degree of uniqueness of each node 132 is maintained, such that each node does not store the exact same access level blocks 140 as another node, to the extent possible and feasible. The amount of uniqueness required and the number of total nodes 132 (i.e., the total cardinality of the nodes) available are both factors in some examples. For each access level block 140, an algorithm may be used to determined which nodes 132 the access level block is to be replicated out to, and then the determined nodes 132 are seeded with the access level blocks 140. Once the nodes are so seeded, in some examples, the permissioned blockchain 134 is ready for normal operation.

In some configurations, requests to retrieve permissions are transmitted from computing device 114 to multiple nodes 132. In order to resolve responses from multiple nodes 132, a consensus is determined. A consensus may be calculated based on a defined percentage of nodes 132 agreeing with one another. However, rather than each node in the permissioned blockchain 134 voting, only blocks 132 that have the corresponding relevant access level block are miners that participate in the consensus vote. For example, if computing device 114 requests permissions to access table 124 of data store 120, but node 132D does not have any access level blocks 140 that refer to table 124, node 132D may not vote on the consensus.

Figure 1B:
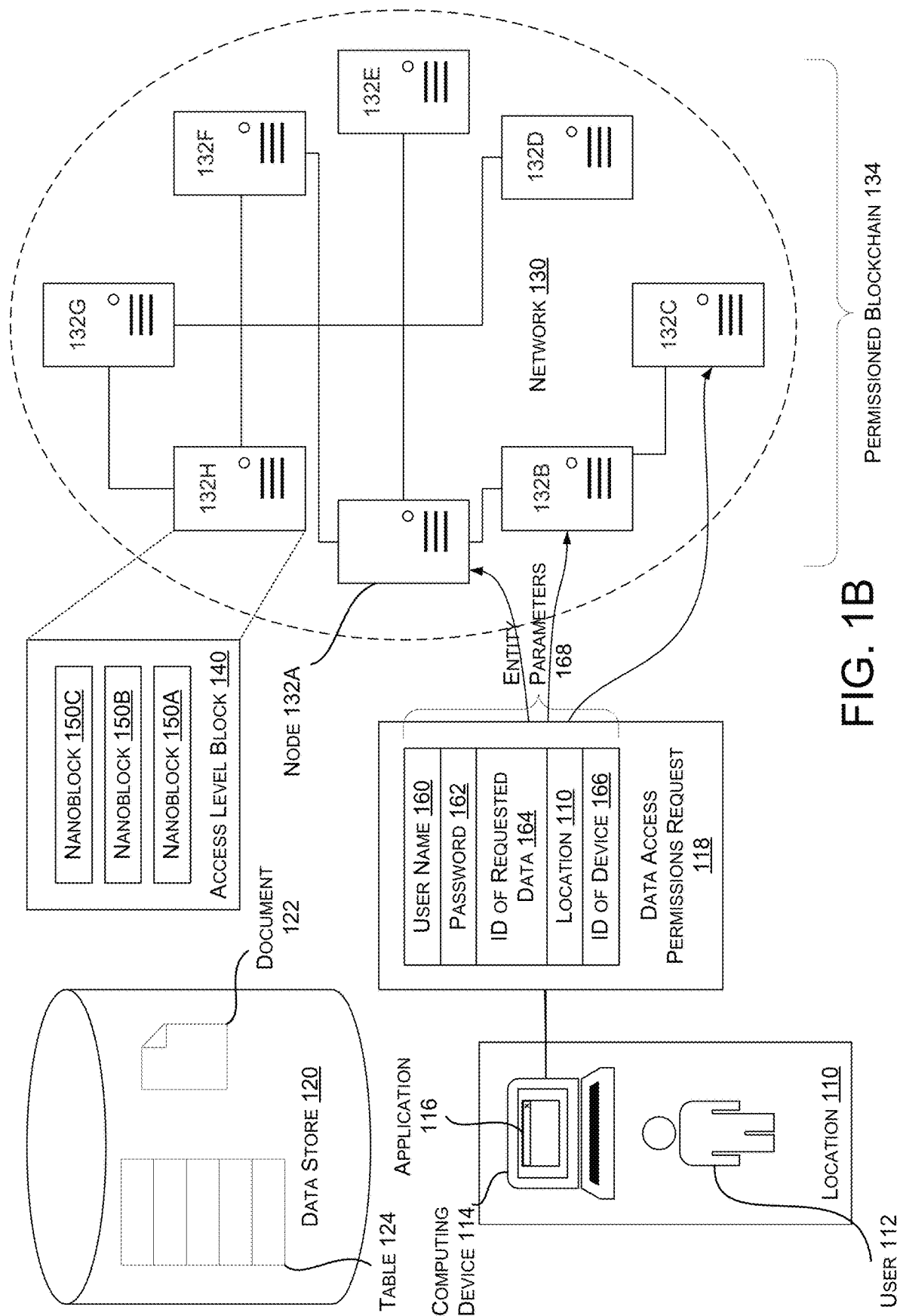

FIG. 1B illustrates an overview of a system for using a permissioned blockchain to access data in a data store. FIG. 1B illustrates a data access permissions request 118 transmitted from computing device 114 to permissioned blockchain 134. Data access permissions request 118 comprises, for example, user name 160 or some other identifier of the user account requesting permission. Data access permissions request 118 also may store password 162, or any other form of user credential supplied by user 112, including biometric data, password hashes, password digests, etc.

In some configurations, data access permissions request 118 includes an identifier of the requested data 164. This identifier may be a primary key, a Universal Resource Locator (URL), a Globally Unique Identifier (GUID), file path, network path, database identifier, database table identifier, or the like, or some combination thereof.

Data access permissions request 118 may also include location 110, which may include a physical location of computing device 114. A physical location may refer to a geographical location, such as a geopolitical entity in which computing device 114 is operating. Location 110 may also refer to a physical location based on GPS coordinates, latitude and longitude or other coordinate system, or proximity to a cell tower, Wi-Fi base station, or other broadcast antenna with a known location.

Data access permissions request 118 may also include an Identifier 166 of computing device 114. The identifier 166 may include a network identifier such as an Internet Protocol (IP) address, a MAC address, a subnet, a domain name, or any other technique usable to identify a computing device on a network. Identifier 166 may also refer to a serial number associated with a web browser, an operating system, a central processing unit, or any other type of unique identifying information.

Collectively, any contextual information about data access permissions request 118, such as the identifier of requested data 164, the location 110, and the identifier of the computing device 166, is referred to as an entity parameter 168. Each parameter may refer to or correspond to an entity access level block 140. The parameters illustrated in FIG. 1B are selected for example purposes, and are not meant to be limiting. Any other type of parameter related to the requested data access is similarly contemplated, such as an identifier of a project the requested data will be used for, a list of recipients of the data, information about the application making the request, including application type and version number, whether computing device 114 has installed all relevant security patches, security certifications associated with computing device 114, etc.

As illustrated, data access permissions request 118 is transmitted from computing device 114 to nodes 132A, 132B, and 132C for processing. The particular nodes 132 selected to receive a particular data access permissions request may be selected randomly, based on geographic proximity, or any other property of data access permissions request 118, computing device 114, application 116, or any other factor. Data access permissions request 118 may also be transmitted to all of nodes 132.

Figure 1C:
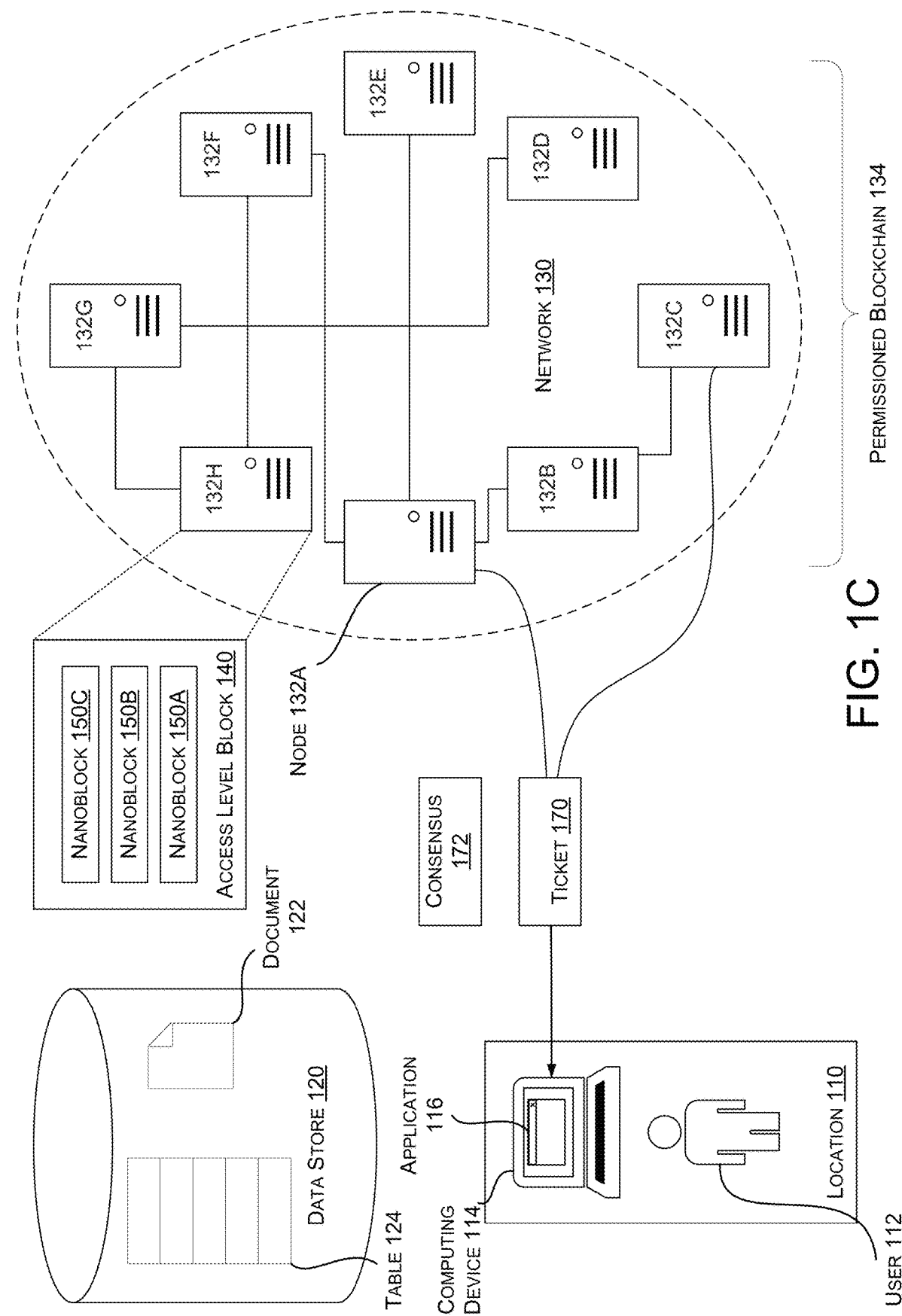

FIG. 1C illustrates an overview of a system for using a permissioned blockchain to access data in a data store. FIG. 1C illustrates ticket 170 returned from nodes 132A and 132C. Ticket 170 may be usable by computing device 114 to access the slice of data identified by data access permissions request 118. Ticket 170 may be received based on a consensus response 172 generated by the nodes 132 that received request 118. In some configurations, the consensus 172 is obtained by permissioned blockchain 134, only after which ticket 170 is returned to computing device 114. In other configurations, computing device 114 receives raw responses to request 118, and infers consensus 172 itself.

Node 132B may not have returned ticket 170 for a number of reasons. Not all nodes 132 receive a copy of every access level block 140, and so node 132B may not have had an access level block corresponding to the entity parameters of request 118. Node 132B may also have not returned ticket 170 because the corresponding access control block 118 has not yet propagated to node 132B. Node 132B may also have crashed or be down for maintenance. Node 132B may also have been compromised by hackers that caused node 132B to not function, or to return an incorrect value.

Figure 1D:
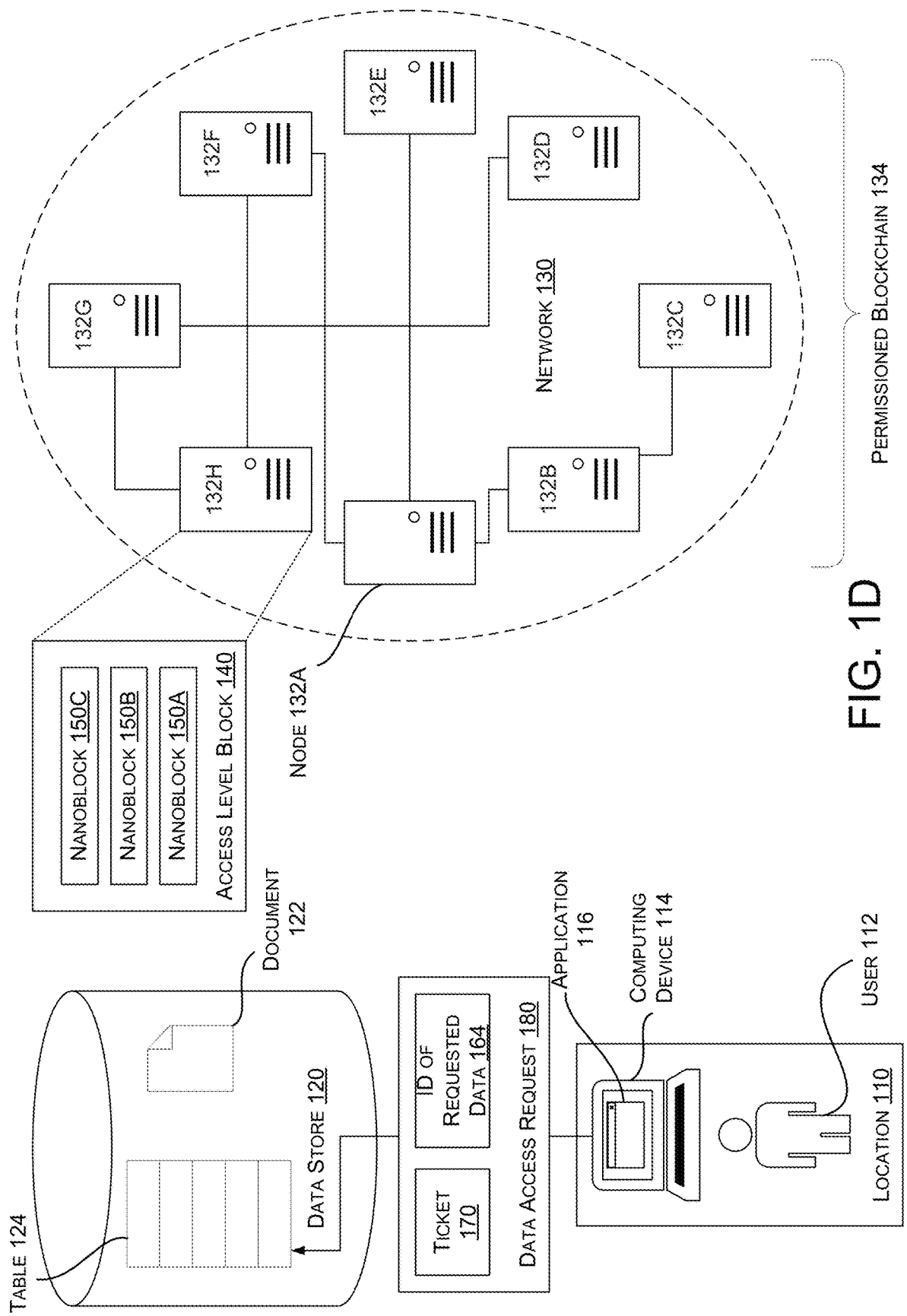

FIG. 1D illustrates an overview of a system for using a permissioned blockchain to access data in a data store. FIG. 1D illustrates data access request 180 containing ticket 170 sent from computing device 114 to data store 120. Data access request 180 may include the identifier of the requested slice of data 164.

Data store 120 may validate that ticket 170 is usable to access the requested slice of data 164, e.g. by performing a cryptographic operation to verify that ticket 170 was issued by permissioned blockchain 134. Data store 120 may also use a cryptographic operation to verify that ticket 170 authorizes access to the data referenced by the identifier of the requested slice of data.

Figure 2:
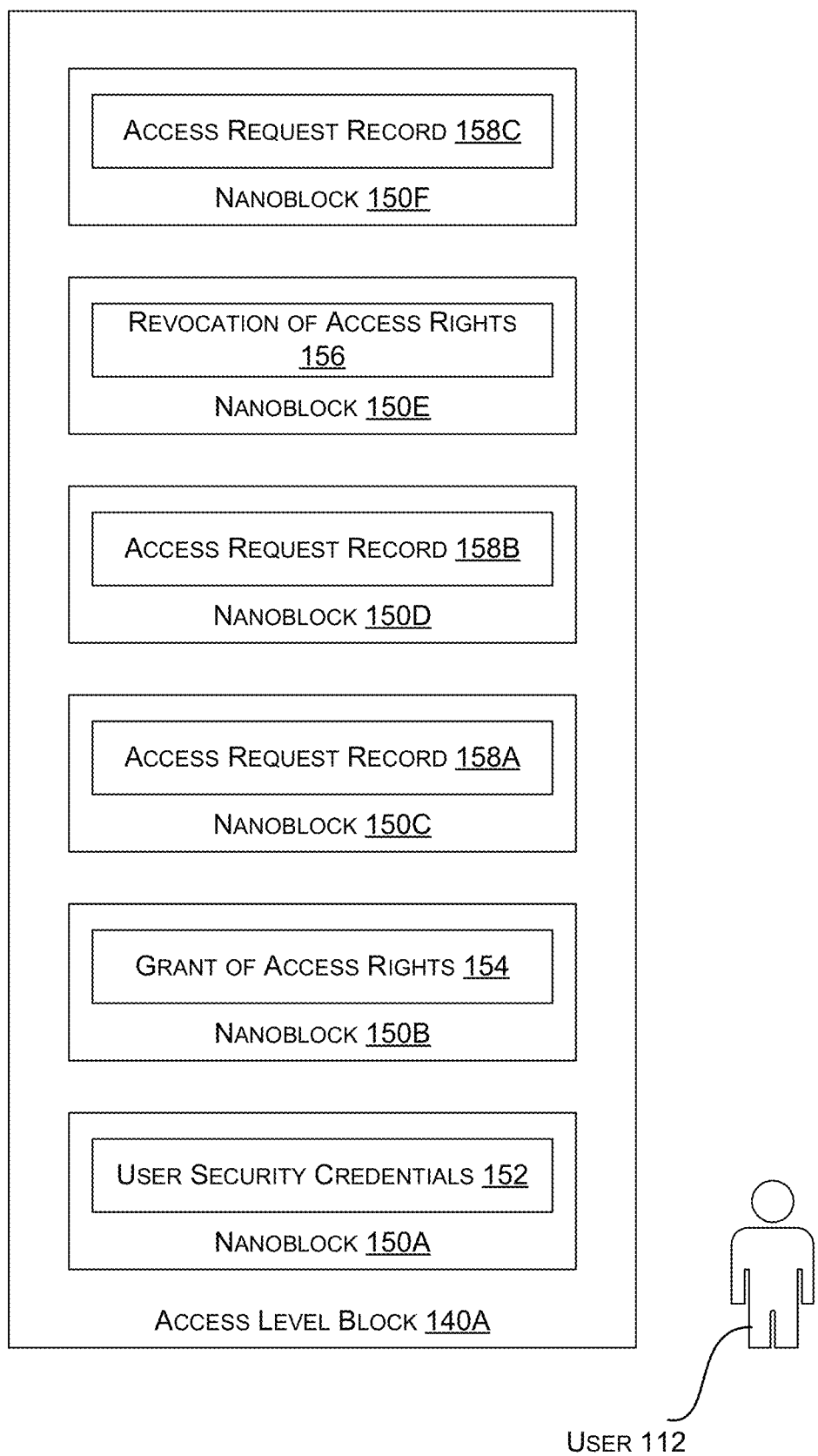
FIG. 2 is a block diagram illustrating an access level block associated with a user account.

FIG. 2 is a block diagram illustrating an access level block associated with a user account. FIG. 2 illustrates access level block 140A, an entity access level block which represents the account of user 112. Access level block 140A includes nanoblock 150A, which stores user security credentials 152. User security credentials 152 may include a password, biometric data, or a hash, digest, or other representation thereof. In some configurations, access level block 140A uses user security credentials 152 to verify that a request for a slice of data contains a valid security credential.

In some embodiments, access rights may be stored in an entity access level block. These access rights may apply to the entity universally, and are not qualified on an access request having any other entity parameters. For example, a user may be granted universal access to non-secure data, regardless of which computing device the request is made from, the geographic location the request originates from, etc. In these embodiments, nanoblock 150B stores grant of access rights 154, which represents an administrative grant of a right of user 112 to access a slice of data.

Nanoblocks 150C, 150D, and 150F store access request records 158A, 158B, and 158C, respectively. Records 158 are log records added every time a ticket request is processed by any access level block associated with user 112. For example, an access request record 158 may be added to the entity access level block 140A when a composite access level block 140 is queried in response to a data access permissions request 118 that includes a user name 160 of user 112 as one of a number of entity parameters 168.

FIG. 3 is a block diagram illustrating an access level block associated with a computing device. FIG. 3 includes access level block 140B, which represents computing device 114 on the permissioned blockchain 134. Access level block 140B is illustrated as having nanoblocks 350A-350F. Nanoblock 350A contains computing device identity 352, which could be a serial number, domain name, computer name, or other unique identifier of computing device 114.

Network address 354 represents a network address of computing device 114. Network address 354 may be an IP address, a MAC address, or any other type of number used to identify computing device 114 on network 130.

Geographic location 356 store a last known location of computing device 114. Geographic location 356 may be stored using GPS coordinates, latitude and longitude, proximity to a radio tower of known location, location within a geopolitical entity such as a city, state, or country, or the like. Geographic location 356 may periodically be superseded by a subsequent geographic location, e.g. geographic location 360 of nanoblock 350F, which may be added any time computing device 114 has been moved to a new location.

Access request records 358A and 358B represent logs of ticket requests that came from or were transmitted on behalf of computing device 114. These ticket request records, like the others discussed herein, may be used to audit data access attempts.

FIG. 4 is a block diagram illustrating an access level block associated with a table of data. Access level block 140C represents a table 124, and includes nanoblocks 450A-450D. Nanoblock 450A stores table identity 452, which is a URL, domain name, IP address, database name, database and table name, or any other identifier used to identify a data table.

Access request records 458A-458C represent logs of records generated when a ticket to access table 124 is requested. Access request records 458 may be generated regardless of which computing device, user, or slice of table 124 was requested.

FIG. 5 is a block diagram illustrating an access level block associated with a specific row of a table of data. While access level block 140C represents an entire table, access level block 140D represents slices, portions, ranges, or other subsets of a table. For example, access level block 140D includes nanoblock 550A, which stores row identity 552. Row identity 552 may identify one or more rows of a database table or other table-based data structure, e.g. with a primary key, a range of primary keys, or a SQL query that returns the identified rows.

Access request records 558A-558C represent logs of records generated when access to row or rows 524 has been requested. Access request records 558 may be generated regardless of which computing device, user, location, or other entity parameter was used to request row 524.

FIG. 6 is a block diagram illustrating an access level block associated with a satellite that generates data. While a satellite is chosen as an example, access level block 140E may be used to represent any kind of data generating computing device that has access to the permissioned blockchain 134. Nanoblock 650A stores satellite identity 652, which distinguishes satellite 602 from other satellites and other devices that capture data.

Nanoblock 650B, storing data capture authorization 658A, indicates the context of the satellite during which data capture is authorized. The context may be expressed in terms of one or more entity parameters. For example, data capture authorization 658A may indicate that an image may only be captured between noon and 1 pm, and only then of a particular target. For example, data capture authorization 658A may indicate that the satellite is authorized to take a picture of Stonehenge (as specified by GPS coordinates) between the hours of 8 am and 8 pm.

Access request records 658A-658B represent logs of records generated when satellite 602 has generated data.

Figure 7:
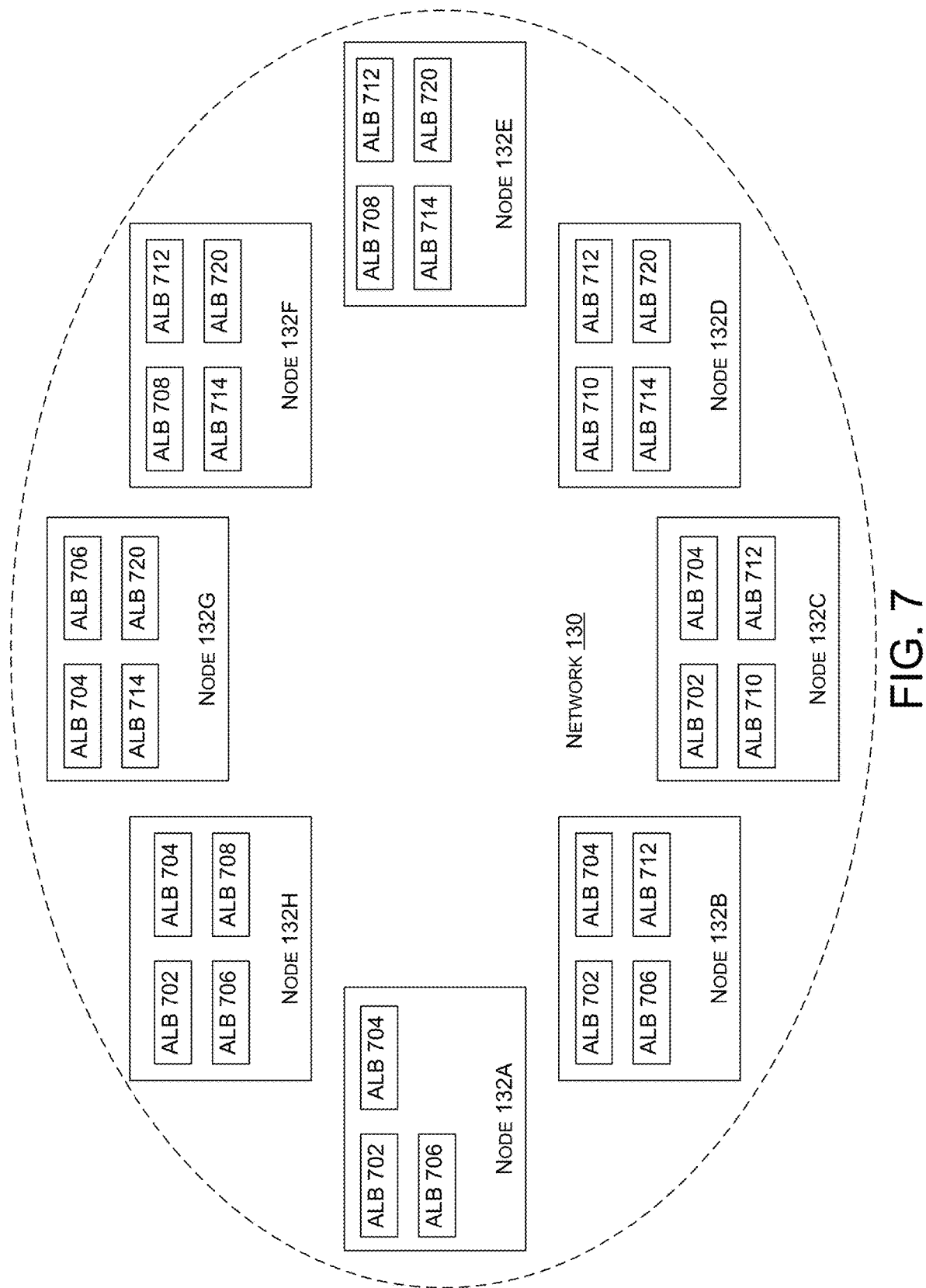
FIG. 7 is a block diagram illustrating a number of network nodes, each of which stores a number of access level blocks.

FIG. 7 is a block diagram illustrating a number of network nodes, each of which stores a number of access level blocks. FIG. 7 illustrates how access level blocks are replicated across the permissioned blockchain 134, ensuring redundancy, resilience against hackers, providing local access to computing device 114 around the world, among other benefits. However, in order to make the data makeup less predictable, not every node 132 stores every access level block.

As illustrated, node 132A stores access level block (ALB) 702, 704, and 706, while node 132B stores ALBs 702, 704, 706, and 712. Node 132C stores ALBs 702, 704, 710, and 712, while node 13D stores ALBs 710, 712, 714, and 720. Node 132E stores ALBs 708, 712, 714, and 720, while node 132F stores ALBs 708, 712, 714, and 720. Node 132G stores ALBs 704, 706, 714, and 720, while node 132H stores ALBs 702, 704, 706, and 708. The number of nodes listed, and the number and combinations of ALBs stored there in are a single example, and any number of nodes storing any number and combination of ALBs is similarly contemplated.

Figure 8:
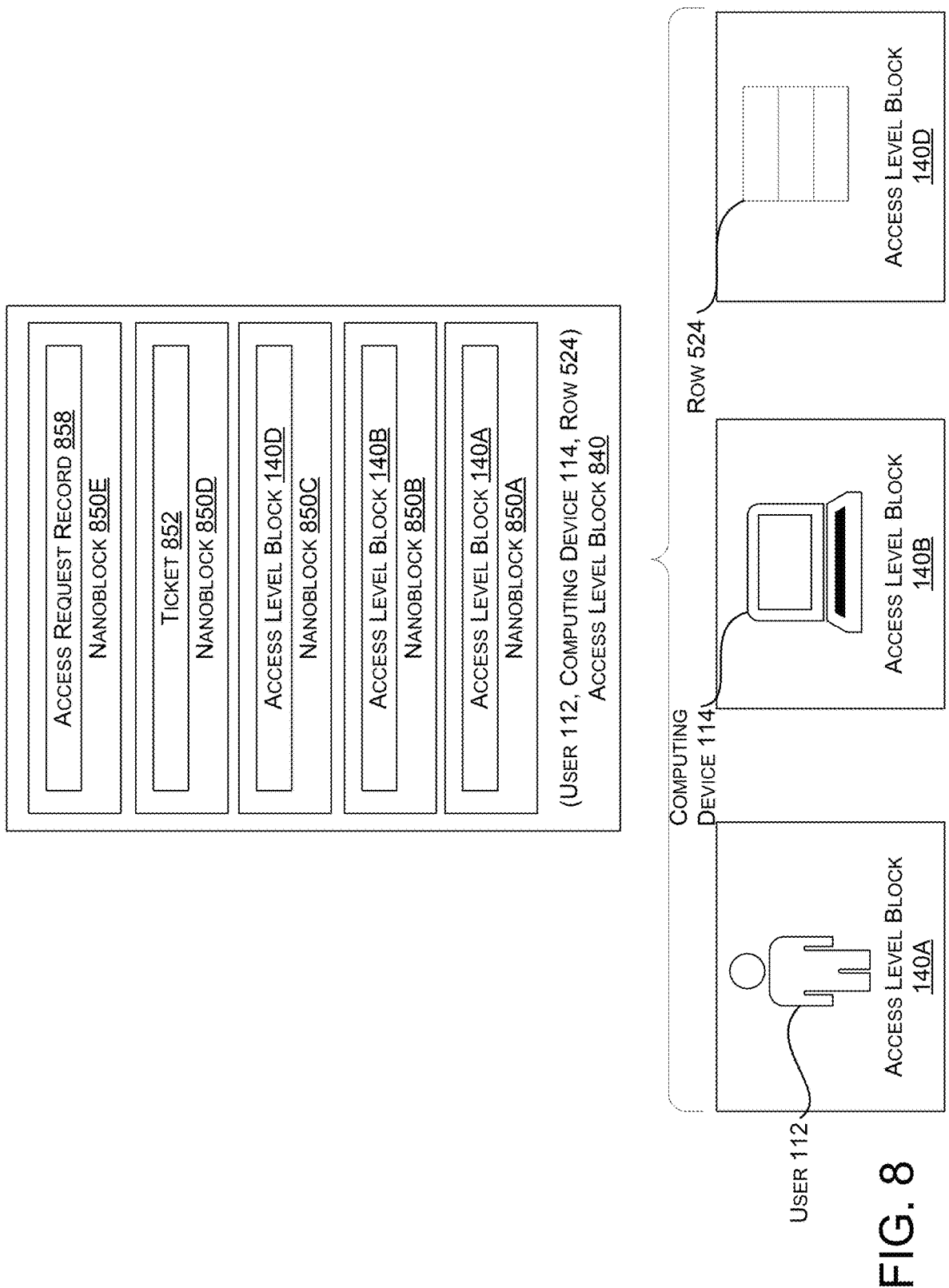
FIG. 8 is a block diagram of an access level block that determines whether a specific user has access to a specific row of a data table from a specific computing device.

FIG. 8 is a block diagram of an access level block that determines whether a specific user has access to a specific row of a data table from a specific computing device. As illustrated, access level block 840 is a composite access level block that stores a ticket 852 in nanoblock 850D allowing user 112 to use computing device 114 to access row 524. Nanoblock 850A stores a reference to the entity access level block 140A that is associated with user 112. Nanoblock 850B stores a reference to the entity access level block 140B that is associated with computing device 114. Nanoblock 850C stores a reference to the entity access level block 140D associated with row 524. However, more, fewer, or different nanoblocks storing different entity access level blocks 140 may be used to create composite access level blocks that refer to a different combination of entities. Similarly, any other type of data slice is similarly contemplated.

In some embodiments, the ticket nanoblock 850D implicitly indicates that access has been granted to the slice of data. In other embodiments, an additional nanoblock, separate from the ticket nanoblock, indicates that access has been granted, in which case the existence of a ticket nanoblock does not imply that access has been granted.

Regardless of how a grant of access is encoded in the access level block, access may be subsequently revoked. Since access level blocks are write-only, the previous grant of access will remain in the access level block. To revoke access (or indicate that access is denied from the start), a nanoblock 850 indicating that access has been denied/revoked may be added to access level block 840.

When a node 132 receives a request 118 for a ticket, node 132 may search for access level blocks that contain references to the entities that are contained in the request 118 and that contain a reference to the requested slice of data. In some configurations, the requested slice of data must match the slice of data in the access level block, e.g. a request to access a specific row of a specific database table will only be granted if an access level block grants access to that specific row of that specific database table. In other configurations, an access level block may be considered to grant access to a requested slice of data if the requested slice of data is a subset of the slice of data referenced by the access level block. For example, if access level block 140D refers to a range of rows that includes row 524, then a request 118 to access row 524 may be satisfied by the access level block. In cases where multiple access level blocks match the requested entities and data slice, the access level block with the smallest slice of data—e.g. the fewest rows, the fewest tables, the fewest XML elements, etc., is selected.

In some configurations, nanoblocks store or are otherwise associated with the order in which they were added to the access level block. This allows node 132 to determine the most recent indication of whether access is granted or denied.

Nanoblock 850E contains access request record 858, a log record indicating that a request by user 112 using computing device 114 to access row 524 has been processed. In some configurations, in response to the same request, similar log records may have been added to entity access level blocks 140A of user 112, 140B of computing device 114, and an access level block 140D representing row 524.

Access level block 840 is but one example of a composite access level block that contains permissions for a specific combination of entities, e.g. user 112, computing device 114, and row 524. To access a different piece of data, such as document 122, a different composite access level block—one that references document 122 instead of row 524—would be retrieved and analyzed. If a ticket request for a slice of data is received, but no composite access level block exists that is specific to the parameters in the ticket request, then the ticket request is rejected. In some configurations, a request 118 that did not match any composite access level blocks would still cause the entity access level blocks associated with user 112, computing device 114, and row 524 to store log records of the request.

Figure 9:
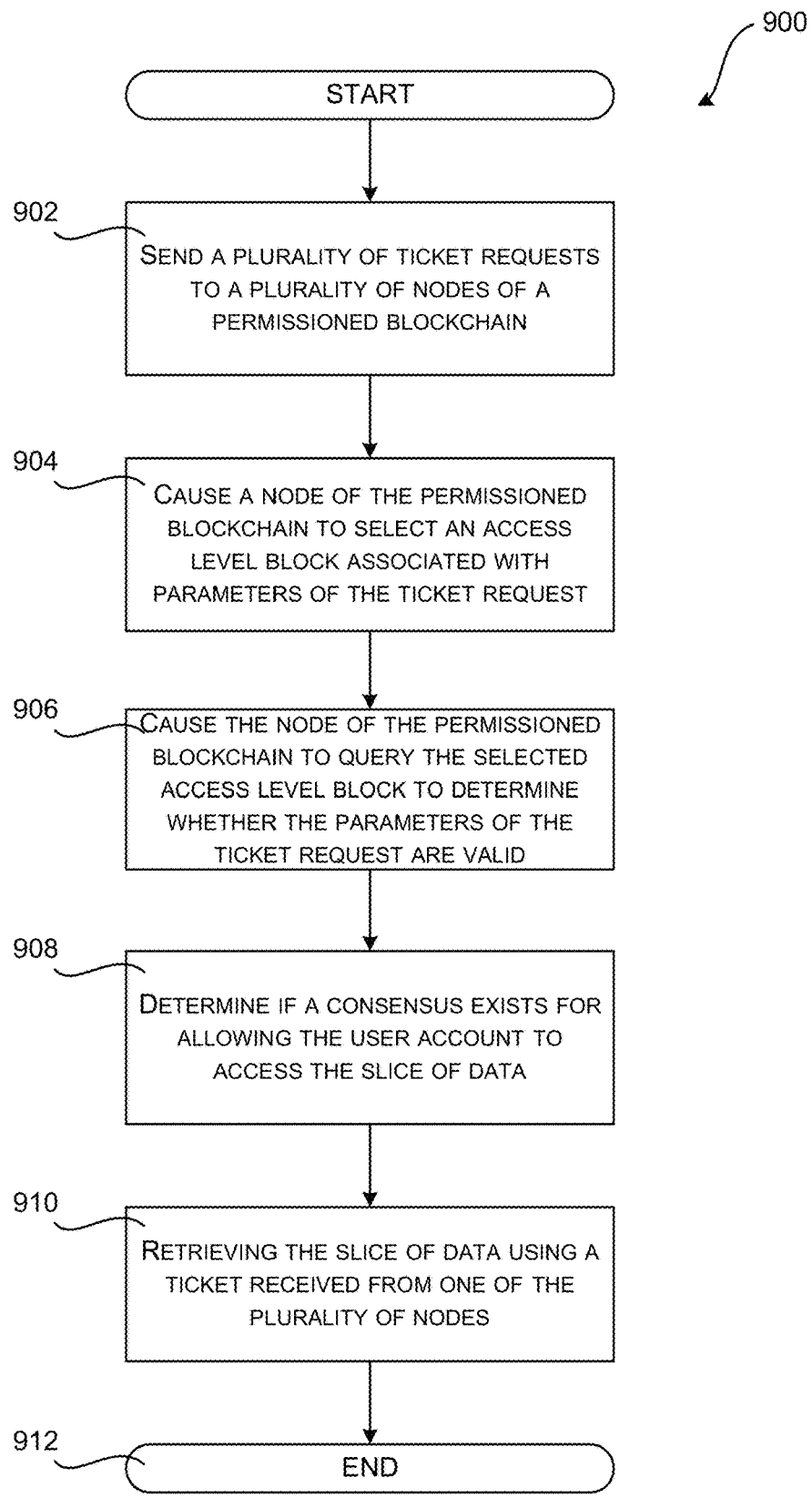
FIG. 9 is a flow diagram of an example method for using a permissioned blockchain to access data stored in a data service.

FIG. 9 is a flow diagram of an example process for using a permissioned blockchain to access data stored in a data service. The process 900 begins after a start block at operation 902, where a plurality of ticket requests 118 are sent by client device 114 to a plurality of nodes 132 of permissioned blockchain 134.

The process 900 then transitions from operation 902 to operation 904, where a node 132 of the permissioned blockchain is caused to select an access level block 840 associated with the parameters of the ticket request. The process 900 then transitions from operation 904 to operation 906, where the node 132 of the permissioned blockchain 134 is caused to query the selected access level block 840 to determine whether the parameters 168 of the ticket request 118 are valid.

The process 900 then transitions from operation 906 to operation 908, where the client device 114 determines if a consensus 172 exists for allowing the user account 140A to access the slice of data 524.

The process 900 then transitions from operation 908 to operation 910, where the client device 114 retrieves the slice of data 524 using the ticket 170 received from the node 132 of the permissioned blockchain 134.

The process 900 then transitions from operation 910 to operation 912, where it ends.

Figure 10:
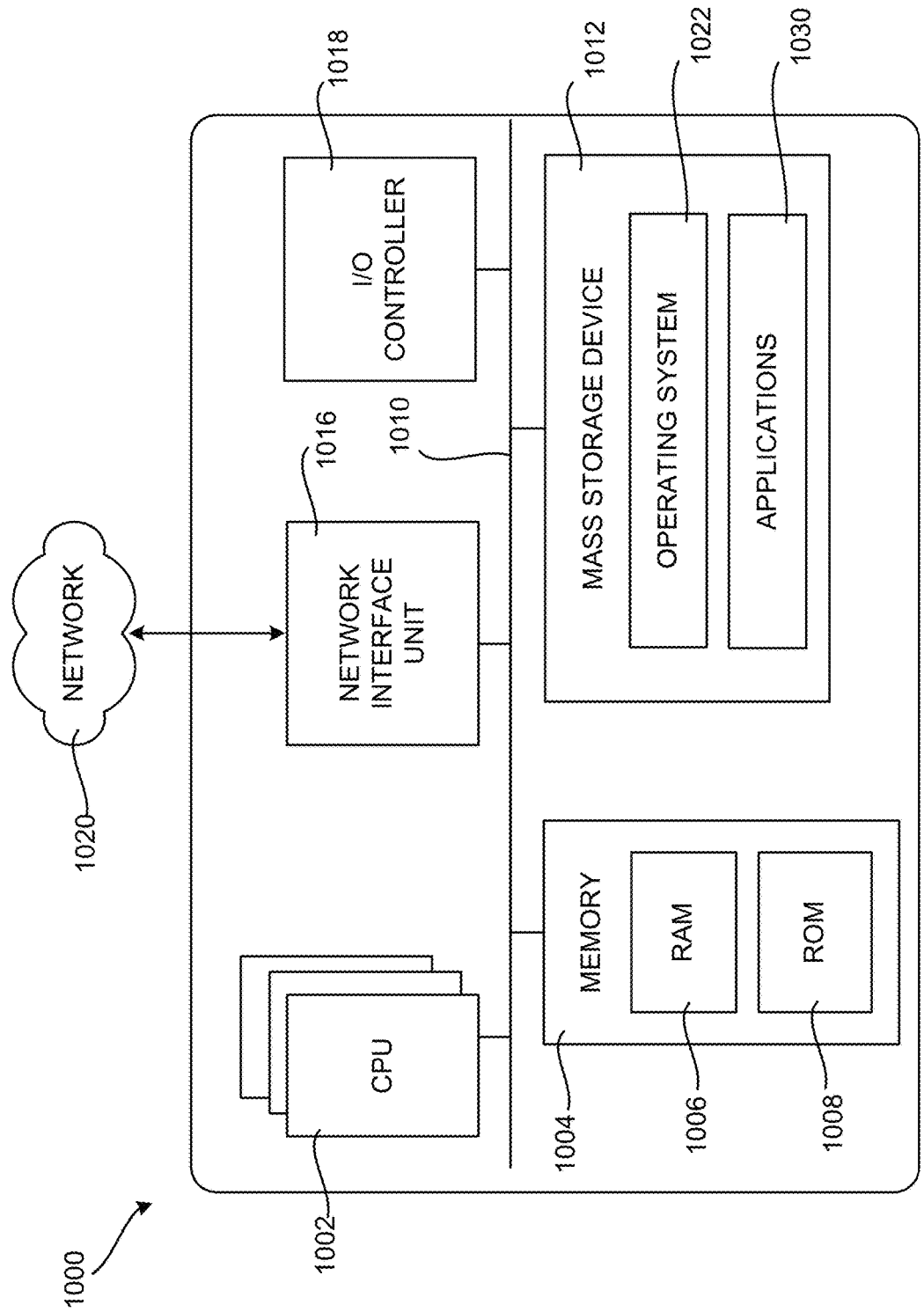
FIG. 10 is a computer architecture diagram showing an illustrative computer hardware and software architecture for a computing device that can implement aspects of the technologies presented herein.

FIG. 10 is a computer architecture diagram showing an illustrative computer hardware and software architecture for a computing device that can implement the various technologies presented herein. In particular, the architecture illustrated in FIG. 10 can be utilized to implement computing device 114, nodes 132, data store 120, or any other computing device disclosed herein.

The computer 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system ("BIOS" or "firmware") containing the basic routines that help to transfer information between elements within the computer 1000, such as during startup, can be stored in the ROM 1008.

The computer 1000 further includes a mass storage device 1012 for storing an operating system 1022, application programs 1030, and other types of programs. The functionality described above is implemented by one or more of these programs in various configurations. The mass storage device 1012 can also be configured to store other types of programs and data.

The mass storage device 1012 is connected to the CPU 1002 through a mass storage controller (not shown) connected to the bus 1010. The mass storage device 1012 and its associated computer readable media provide non-volatile storage for the computer 1000. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer storage medium," and variations thereof, does not include waves or signals per se or communication media.

According to various configurations, the computer 1000 can operate in a networked environment using logical connections to remote computers through a network such as the network 1020. The computer 1000 can connect to the network 1020 through a network interface unit 1016 connected to the bus 1010. It should be appreciated that the network interface unit 1016 can also be utilized to connect to other types of networks and remote computer systems. The computer 1000 can also include an input/output controller 1018 for receiving and processing input from a number of other devices, including a keyboard, mouse, touch input, a digital pen, or a physical sensor such as cameras and biometric sensors.

It should be appreciated that the software components described herein, when loaded into the CPU 1002 and executed, can transform the CPU 1002 and the overall computer 1000 from a general-purpose computing device into a special-purpose computing device customized to facilitate the functionality presented herein. The CPU 1002 can be constructed from any number of transistors or other discrete circuit elements, which can individually or collectively assume any number of states. More specifically, the CPU 1002 can operate as a finite-state machine, in response to executable instructions contained within the software modules disclosed herein. These computer-executable instructions can transform the CPU 1002 by specifying how the CPU 1002 transitions between states, thereby transforming the transistors or other discrete hardware elements constituting the CPU 1002.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the architecture shown in FIG. 10 for the computer 1000, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1000 might not include all of the components shown in FIG. 10, can include other components that are not explicitly shown in FIG. 10, or can utilize an architecture completely different than that shown in FIG. 10.

It should be appreciated that the computing architecture shown in FIG. 10 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1: A computer-implemented method for a user account to access a slice of data, comprising: sending a plurality of ticket requests to a plurality of nodes of a permissioned blockchain, each request including user credentials, an identifier of the user account, and an identifier of the slice of data, wherein each of the plurality of nodes stores an access level block associated with the user account and the slice of data, wherein the access level block is not associated with other user accounts or other slices of data, wherein the access level block comprises a plurality of nanoblocks including a nanoblock storing a ticket usable to access the slice of data and a nanoblock storing data usable to confirm validity of the user credentials, and wherein each of the plurality of ticket requests causes a node of the permissioned blockchain to: select the access level block associated with the user account and the slice of data based on the identifier of the user account and the identifier of the slice of data, and query the selected access level block to determine whether the user credentials are valid; determining if a consensus for allowing the user account to access the slice of data exists based on the determinations made by each of the plurality of nodes whether the user credentials are valid; and retrieving the slice of data using the ticket received from at least one of the plurality of nodes.

Clause 2: The computer-implemented method of clause 1, wherein each access level block associated with the user account and the slice of data comprises a copy of a write-only ledger distributed across the plurality of nodes.

Clause 3: The computer-implemented method of clause 1, wherein a nanoblock storing a record of the request is appended to each access level block associated with the user account and the slice of data.

Clause 4: The computer-implemented method of clause 1, wherein each of the plurality of nanoblocks are stored as a database, a data file, or a data table.

Clause 5: The computer-implemented method of clause 1, wherein the user account is represented as an access level block replicated across a plurality of nodes of the permissioned blockchain.

Clause 6: The computer-implemented method of clause 5, wherein a nanoblock storing a record of the request is added to the access level block representing the user account.

Clause 7: The computer-implemented method of clause 1, wherein the slice of data is represented as an access level block replicated across a plurality of nodes of the permissioned blockchain.

Clause 8: The computer-implemented method of clause 7, wherein a nanoblock storing a record of the request is added to the access level block representing the slice of data.

Clause 9: The computer-implemented method of clause 1, wherein a request for a second user account to access the slice of data is processed using a second access level block that is associated with the second user account and the slice of data.

Clause 10: The computer-implemented method of clause 1, wherein a request for the user account to access a second slice of data is processed using a third access level block that is associated with the user account and the second slice of data.

Clause 11: A system comprising: one or more processing units; and a computer-readable storage medium having computer-executable instructions stored thereupon, which, when executed by the one or more processing units, cause the one or more processing units to: send a plurality of ticket requests to a plurality of nodes of a permissioned blockchain, each request including user credentials, an identifier of the user account, and an identifier of the slice of data, wherein each of the plurality of nodes stores an access level block that is associated with the user account and the slice of data and that is not associated with other user accounts or other slices of data, wherein each access level block comprises a plurality of nanoblocks including a nanoblock storing a ticket usable to access the slice of data and a nanoblock storing data usable to confirm the user credentials, and wherein each of the plurality of ticket requests causes a node of the permissioned blockchain to: select the access level block associated with the user account and the slice of data based on the identifier of the user account and the identifier of the slice of data, and query the selected access level block to determine whether the user credentials are valid; receive a determination from the permissioned blockchain whether a consensus for allowing the user account to access the slice of data exists, the determination based on the determinations made by each of the plurality of nodes whether the user credentials are valid; and retrieve the slice of data using permissions received from at least one of the plurality of nodes.

Clause 12: The system of clause 11, wherein every combination of user account, computing device requesting permission, location of the computing device requesting permission, and slice of data for which permissions have been granted are represented by separate access level blocks.

Clause 13: The system of clause 11, wherein the permissions can be added to, modified, or deleted by adding another nanoblock to the access level block.

Clause 14: The system of clause 11, wherein the slice of data comprises a table of a database, one or more rows of a table of data, a range of contiguous rows of a table of data, or one or more cells of a table of data.

Clause 15: The system of clause 11, wherein the permissions allow the slice of data to be read, written to, forwarded, or annotated.

Clause 16: The system of clause 11, further comprising a data capture device, wherein the permissions indicate a geographical location from which or a span of time during which the data capture device is authorized to capture data.

Clause 17: The system of clause 16, wherein the permissions further indicate where the captured data is authorized to be stored.

Clause 18: A system comprising: one or more processing units; and a computer-readable storage medium having computer-executable instructions stored thereupon, which, when executed by the one or more processing units, cause the one or more processing units to: cause a permissioned blockchain to be deployed to a plurality of nodes; establish a plurality of access level blocks, wherein each access level block is configured to store a plurality of nanoblocks, wherein each nanoblock is an encrypted data store, wherein the plurality of access level blocks include an access level block for each unique combination of user account and data slice for which access to a data slice has been granted to a user account, and wherein the corresponding access level block for each unique combination of user account and data slice includes security credentials for the user account; and for each access level block of the plurality of access level blocks: select nodes among the plurality of nodes for deployment of the access level block; and replicate the access level block to each of the selected nodes, such that, after replicating the access level blocks, there are at least two copies of each access level block on the permissioned blockchain.

Clause 19: The system of clause 18, wherein the permissioned blockchain is capable of performing cryptographic operations, including determining if a user account has been granted access to a slice of data based at least in part on the security credentials for the user accounts.

Clause 20: The system of clause 19, wherein the permissioned blockchain is further capable of storing records of the cryptographic operations as nanoblocks of the access level blocks.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resources, two different users, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A computer-implemented method for a user account to access a slice of data, comprising:
   sending a plurality of ticket requests to a plurality of nodes of a permissioned blockchain, each ticket request of the plurality of ticket requests including user credentials, an identifier of the user account, and an identifier of the slice of data, wherein:
      each node of the plurality of nodes stores an access level block associated with the user account and the slice of data,
      the access level block is not associated with other user accounts and other slices of data,
      the access level block comprises a plurality of nanoblocks including a first nanoblock storing a ticket usable to access the slice of data and a second nanoblock storing data usable to confirm validity of the user credentials, and
      each ticket request of the plurality of ticket requests causes a corresponding node of the permissioned blockchain to:
         select the access level block associated with the user account and the slice of data based on the identifier of the user account and the identifier of the slice of data, and
         query the selected access level block to determine whether the user credentials are valid;
   determining that a consensus for allowing the user account to access the slice of data exists based on the determinations made by individual nodes of the plurality of nodes with regard to whether the user credentials are valid; and
   based on the determining that the consensus for allowing the user account to access the slice of data exists, retrieving the slice of data using a ticket received from at least one node of the plurality of nodes.

2. The computer-implemented method of claim 1, wherein the access level block associated with the user account and the slice of data comprises a copy of a write-only ledger distributed across the plurality of nodes.

3. The computer-implemented method of claim 1, wherein:
   the plurality of nanoblocks include another nanoblock storing a record of the ticket request, and
   the other nanoblock is appended to the access level block associated with the user account and the slice of data.

4. The computer-implemented method of claim 1, wherein each nanoblock of the plurality of nanoblocks is stored as a database, a data file, or a data table.

5. The computer-implemented method of claim 1, wherein the user account is uniquely represented by the access level block and the access level block is replicated across the plurality of nodes of the permissioned blockchain.

6. The computer-implemented method of claim 5, wherein:
the plurality of nanoblocks include another nanoblock storing a record of the ticket request, and
the other nanoblock is added to the access level block representing the user account.

7. The computer-implemented method of claim 1, wherein the slice of data is represented by the access level block and the access level block is replicated across the plurality of nodes of the permissioned blockchain.

8. The computer-implemented method of claim 7, wherein:
the plurality of nanoblocks include another nanoblock storing a record of the request, and
the other nanoblock is added to the access level block representing the slice of data.

9. The computer-implemented method of claim 1, wherein a request for another user account to access the slice of data is processed using another access level block that is associated with the other user account and the slice of data.

10. The computer-implemented method of claim 1, wherein a request for the user account to access another slice of data is processed using another access level block that is associated with the user account and the other slice of data.

11. A system comprising:
one or more processing units; and
a non-transitory computer-readable storage medium having computer-executable instructions stored thereupon, which, when executed by the one or more processing units, cause the one or more processing units to:
send a plurality of ticket requests to a plurality of nodes of a permissioned blockchain, each ticket request of the plurality of ticket requests including user credentials, an identifier of the user account, and an identifier of the slice of data, wherein:
each node of the plurality of nodes stores an access level block that is associated with the user account and the slice of data,
the access level block is not associated with other user accounts and other slices of data,
the access level block comprises a plurality of nanoblocks including a first nanoblock storing a ticket usable to access the slice of data and a second nanoblock storing data usable to confirm the user credentials, and
each of the plurality of ticket requests causes a corresponding node of the permissioned blockchain to:
select the access level block associated with the user account and the slice of data based on the identifier of the user account and the identifier of the slice of data, and
query the selected access level block to determine whether the user credentials are valid;
receive a determination from the permissioned blockchain that a consensus for allowing the user account to access the slice of data exists, the determination based on the determinations made by individual nodes of the plurality of nodes with regard to whether the user credentials are valid; and
based on the determination that the consensus for allowing the user account to access the slice of data exists, retrieve the slice of data using permissions received from at least one node of the plurality of nodes.

12. The system of claim 11, wherein every combination of user account, computing device requesting permission, location of the computing device requesting permission, and slice of data for which permissions have been granted are represented by separate access level blocks.

13. The system of claim 11, wherein the permissions can be added to, modified, or deleted by adding another nanoblock to the access level block.

14. The system of claim 11, wherein the slice of data comprises a table of a database, one or more rows of a table of data, a range of contiguous rows of a table of data, or one or more cells of a table of data.

15. The system of claim 11, wherein the permissions allow the slice of data to be read, written to, forwarded, or annotated.

16. The system of claim 11, further comprising a data capture device, wherein the permissions indicate a geographical location from which, or a span of time during which, the data capture device is authorized to capture data.

17. The system of claim 16, wherein the permissions further indicate where the captured data is authorized to be stored.

18. The computer-implemented method of claim 1, wherein the consensus comprises a defined percentage of the plurality of nodes.

19. The system of claim 11, wherein the consensus comprises a defined percentage of the plurality of nodes.

20. A non-transitory computer-readable storage medium having computer-executable instructions stored thereupon which, when executed by one or more processing units, cause the one or more processing units to:
send a plurality of ticket requests to a plurality of nodes of a permissioned blockchain, each ticket request of the plurality of ticket requests including user credentials, an identifier of the user account, and an identifier of the slice of data, wherein:
each node of the plurality of nodes stores an access level block associated with the user account and the slice of data,
the access level block is not associated with other user accounts and other slices of data,
the access level block comprises a plurality of nanoblocks including a first nanoblock storing a ticket usable to access the slice of data and a second nanoblock storing data usable to confirm validity of the user credentials, and
each ticket request of the plurality of ticket requests causes a corresponding node of the permissioned blockchain to:
select the access level block associated with the user account and the slice of data based on the identifier of the user account and the identifier of the slice of data, and
query the selected access level block to determine whether the user credentials are valid;
determine that a consensus for allowing the user account to access the slice of data exists based on the determinations made by individual nodes of the plurality of nodes with regard to whether the user credentials are valid; and
based on the determining that the consensus for allowing the user account to access the slice of data exists, retrieve the slice of data using a ticket received from at least one node of the plurality of nodes.

\* \* \* \* \*